United States Patent
Ohmura et al.

(10) Patent No.: US 7,652,560 B2
(45) Date of Patent: Jan. 26, 2010

(54) OBSTACLE DETECTING CONTROL DEVICE OF VEHICLE

(75) Inventors: Hiroshi Ohmura, Hiroshima (JP); Haruki Okazaki, Hiroshima (JP); Takuji Oka, Hiroshima (JP); Takashi Nakagami, Hiroshima (JP); Sei Kobayashi, Hiroshima (JP); Masanobu Fukushima, Hiroshima (JP); Takashi Terano, Hiroshima (JP)

(73) Assignee: Mazda Motor Corporation (JP)

( * ) Notice: Subject to any disclaimer, the term of this patent is extended or adjusted under 35 U.S.C. 154(b) by 326 days.

(21) Appl. No.: 11/730,425

(22) Filed: Apr. 2, 2007

(65) Prior Publication Data
US 2007/0241870 A1    Oct. 18, 2007

(30) Foreign Application Priority Data
Apr. 7, 2006    (JP)    ................ 2006-106858

(51) Int. Cl.
*B60Q 1/00*    (2006.01)
(52) U.S. Cl. .............. 340/436; 340/435; 340/903; 340/904; 340/511
(58) Field of Classification Search ............ 340/435, 340/436, 903, 904, 511; 180/232, 274; 280/734, 280/735; 342/70, 71, 72; 701/300, 301
See application file for complete search history.

(56) References Cited

U.S. PATENT DOCUMENTS

| | | | |
|---|---|---|---|
| 6,124,823 A | | 9/2000 | Tokoro |
| 6,583,403 B1 | | 6/2003 | Koike et al. |
| 7,136,753 B2 | * | 11/2006 | Samukawa et al. ......... 701/301 |
| 7,218,208 B2 | * | 5/2007 | Kikuchi ................. 340/435 |
| 7,289,017 B2 | * | 10/2007 | Sawamoto et al. ....... 340/425.5 |
| 2004/0019426 A1 | * | 1/2004 | Knoop et al. ............. 701/301 |

FOREIGN PATENT DOCUMENTS

| | | |
|---|---|---|
| EP | 0 773 453 | 5/1997 |
| GB | 2 104 333 | 3/1983 |
| JP | 2001-033550 | 2/2001 |

OTHER PUBLICATIONS

European Search Report Application EP 07 00 6446 dated Jul. 9, 2007.

* cited by examiner

*Primary Examiner*—Hung T. Nguyen
(74) *Attorney, Agent, or Firm*—Studebaker & Brackett PC; Donald R. Studebaker

(57) ABSTRACT

A radar device is configured to transmit an electric wave and receives a reflected wave that is generated by a reflection of the electric wave on an object, and to recognize the object is a potential obstacle that is to be hit by the vehicle when a received intensity of the reflected wave thereby is a specified threshold or more. And, the specified threshold has a plurality of preset values. Accordingly, a determination as to whether or not the obstacle detected by the radar device is the potential obstacle to be hit by the vehicle can be accurately made.

6 Claims, 5 Drawing Sheets

OBSTACLE DETECTING CONTROL DEVICE OF VEHICLE

BACKGROUND OF THE INVENTION

The present invention relates to an obstacle detecting control device of a vehicle, which includes a radar device to detect an obstacle in front of the vehicle and an operational-device control device to control an operational device of the vehicle according to an obstacle detecting information detected by the radar device.

Conventionally, an obstacle detecting device that detects an obstacle in front of the vehicle with a radar device such as a millimeter-wave radar device is known. According to this device, the obstacle in front of the vehicle, including a vehicle traveling in front, is detected by the radar device, and when a vehicle hitting the obstacle is predicted based on the obstacle detecting information, an operational-device control device operates a brake or a seatbelt pre-tensioner to wind up a seatbelt of a passenger.

The radar device, for example, as disclosed in Japanese Patent Laid-Open Publication No. 2001-33550, is configured to detect an object by transmitting an electric wave and receiving a reflected wave that is generated by a reflection of the electric wave on the object. And, the object is recognized as a potential obstacle that is to be hit by the vehicle when a received intensity of the reflected wave (reflection intensity) is a specified threshold or more, and then the object is pursued continuously. When the vehicle hitting the obstacle is predicted, the brake and seatbelt pre-tensioner are operated.

Herein, the above-described specified threshold for determination as to whether or not the object detected by the radar device is a potential obstacle to be hit by the vehicle has a preset value of −50 dBV, for example.

However, if the specified threshold has only one value for the determination, there is a risk in that some object having no possibility of hitting against the vehicle would be mistakenly recognized as the above-described potential obstacle. This error recognition may occur in a case where the object is a stationary one. For instance, in a situation in which a slope 71 provided at an entrance of a two-story parking lot is comprised of gratings (meshes), as shown in FIG. 5A, and a connecting portion 72 of the gratings is comprised of a H-shaped steel member shown in FIG. 5B, there is a risk in that this connecting portion 72 would be mistakenly recognized as the potential obstacle that may be hit by the vehicle. Thereby, when the vehicle approaches the slope 71, the brake or the restraint of the passenger with the seatbelt would occur improperly.

SUMMARY OF THE INVENTION

The present invention has been devised in view of the above-described problem, and an object of the present invention is to provide an obstacle detecting control device for a vehicle in which a determination as to whether or not an obstacle detected by a radar device is a potential obstacle to be hit by the vehicle can be accurately made.

According to the present invention, there is provided an obstacle detecting control device of a vehicle, which includes a radar device to detect an obstacle in front of the vehicle and an operational-device control device to control an operational device of the vehicle according to an obstacle detecting information detected by the radar device, wherein the radar device is configured to transmit an electric wave and receives a reflected wave that is generated by a reflection of the electric wave on an object, to recognize the object is a potential obstacle that is to be hit by the vehicle when a received intensity of the reflected wave thereby is a specified threshold or more, and to output an information related to the recognized object as the potential obstacle to the operational-device control device as the obstacle detecting information, and the specified threshold has a plurality of preset values.

According to the above-described obstacle detecting control device, the specified threshold can be used properly by selecting appropriate values according to the kind of object detected, i.e., the stationary object or the moving object (like a vehicle traveling in front). As a result, the determination as to whether or not the detected object is the potential obstacle that the vehicle will hit can be made accurately. Thereby, the operational-device control device can properly control the operational device, such as a brake or seatbelt pre-tensioner of the vehicle, based on the information related to the obstacle that is detected by the radar device.

According to an embodiment of the present invention, the radar device comprises a determining device to determine whether the detected object is a moving object or a stationary object, and the plural threshold values includes a threshold for moving object and a threshold for stationary object, the threshold for moving object being for recognizing the moving object as the obstacle, the threshold for stationary object being for recognizing the stationary object as the obstacle.

According to another embodiment of the present invention, the threshold for stationary object is configured to have a greater preset value than the threshold for moving object.

According to the above-described embodiments, the recognition of the moving object, such as the vehicle traveling in front, as the potential obstacle can be surely made, preventing improper recognition of the stationary object like the above-described connecting portions of the slope comprised of gratings as the potential obstacle.

According to another embodiment of the present invention, there is further provided a vehicle speed detecting device to detect a traveling speed of the vehicle, and the radar device is configured to conduct a determination of the stationary object as the obstacle by using the threshold for stationary object when the vehicle traveling speed detected by the vehicle speed detecting device is a specified speed or less.

Thereby, when the vehicle travels on the slope comprised of gratings at a relatively slow speed that is the specified speed or less, the determination as to whether or not the stationary object is recognized as the obstacle is made by using the threshold for stationary object. Accordingly, the stationary object like the connecting portions of the slope comprised of gratings is not recognized as the obstacle. Meanwhile, when the vehicle traveling speed is more than the specified speed, the determination as to whether or not the stationary object is recognized as the obstacle is made by using the threshold for moving object even if that is the stationary object. Accordingly, the recognition of the obstacle can be properly made in a case where the stationary object is a real obstacle.

According to another embodiment of the present invention, there is further provided a vehicle speed detecting device to detect a traveling speed of the vehicle, the radar device further detects a distance between the detected object and the vehicle, and the radar device is configured to conduct a determination of the stationary object as the obstacle by using the threshold for stationary object when the distance detected by the radar device is a specified distance or less and the vehicle traveling speed detected by the vehicle speed detecting device is a specified speed or less.

Thereby, when the vehicle approaches the stationary object like the above-described connecting portions of the slope at the relatively slow speed, the determination as to whether that stationary object is the obstacle or not is made. Accordingly, the determination of that stationary object like the connecting portions of the slope as the obstacle can be avoided properly. Meanwhile, until the vehicle approaches the stationary object close enough, the determination as to whether that stationary object is the obstacle or not is made by using the threshold for moving object even though that object is the stationary one. Accordingly, the recognition of the obstacle can be further properly made in the case where the stationary object is the real obstacle.

According to another embodiment of the present invention, the radar device is configured to recognize that the stationary object determined by the determining device is the obstacle when the received intensity of the reflected wave from the stationary object is the threshold for stationary object or more, the radar device is further configured to provisionally recognize that the stationary object determined by the determining device is the obstacle when said received intensity of the reflected wave from the stationary object is the threshold for moving object or more and less than the threshold for stationary object, and obstacle-related information of the stationary object that has been provisionally recognized as the obstacle is outputted to the operational-device control device as a different information from obstacle-related information of the stationary object that has been recognized as the obstacle.

Thereby, the operational-device control device that receives the information of the provisionally-recognized obstacle can be configured not to operate the operational device based on that information, dealing with that information just as a reference information, for example. In the meantime, the radar device can continue to pursue that provisionally-recognized obstacle, so the recognition as the obstacle can be attained promptly in the case where that is the real obstacle. As a result, the operation of the operational device by the operational-device control device can be properly attained.

According to another embodiment of the present invention, the above-described threshold for stationary object comprises a first threshold and a second threshold that is greater than the first threshold, and the radar device is configured to change the threshold for stationary object from the first threshold to the second threshold to be used when conducting the determination of the stationary object as the obstacle with respect to the stationary object that has been provisionally recognized as the obstacle.

Thereby, any risks of improperly repeated recognitions between the above-described recognition and the provisional recognition of the statuary object can be properly avoided with the threshold for stationary object having a so-called hysteresis.

According to another embodiment of the present invention, the radar device is a millimeter-wave radar. Thereby, since the obstacle can be properly captured even under situations such as rainy or foggy conditions, the proper radar device can be provided.

According to further another embodiment of the present invention, the operational device is a brake operating device to operate a braking of the vehicle, or a seatbelt pre-tensioner to restrain a passenger by winding up a seatbelt of the passenger to apply a specified tension to the seatbelt. Thereby, the proper operations of the brake operating device or the seatbelt pre-tensioner can be attained, so the safety of the passenger can be improved.

Other features, aspects, and advantages of the present invention will become apparent from the following description which refers to the accompanying drawings.

DETAILED DESCRIPTION OF THE INVENTION

Hereinafter, a preferred embodiment of the present invention will be described referring to the accompanying drawings.

Figure 1:
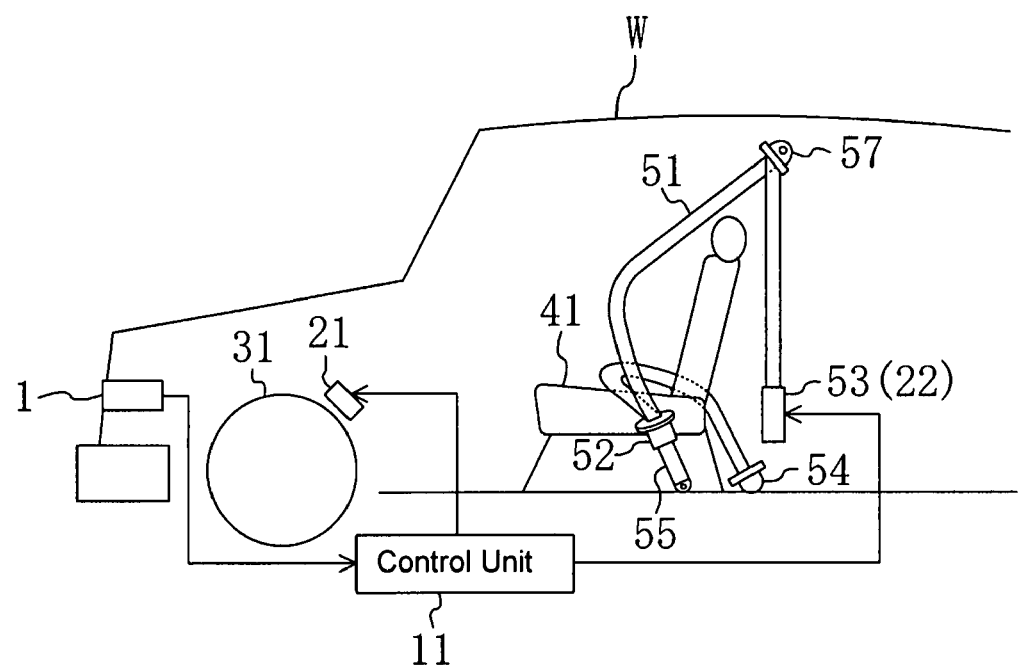
FIG. 1 is a schematic view of a front side of a vehicle equipped with an obstacle detecting control device according to an embodiment of the present invention.

FIG. 1 shows a vehicle W (a traveling vehicle as an automotive vehicle in the present embodiment) that is equipped with an obstacle detecting control device according to an embodiment of the present invention. At a front end of the vehicle W is provided a radar device 1 to detect an obstacle in front of the vehicle W. This radar device 1 is a millimeter-wave radar, which transmits a millimeter wave (electric wave) forward by scanning substantially horizontally within a specified-angle area, and receives a reflected wave that is generated by a reflection of the millimeter-wave on an object in front of the vehicle W for detection of the object with an antenna 2. The radar device 1 further comprises a processing portion 4 to conduct various processing based on data received from the antenna 2, including recognition processing as to whether or not the detected obstacle is a potential obstacle, which will be described below.

The vehicle W comprises a control unit 11 as an operational-device control device to control an operational device of the vehicle W according to obstacle detecting information supplied from the processing portion 4 of the radar device 1. The operational device comprises a brake operating device 21 and a seatbelt pre-tensioner 22 in the present embodiment.

Figure 2:
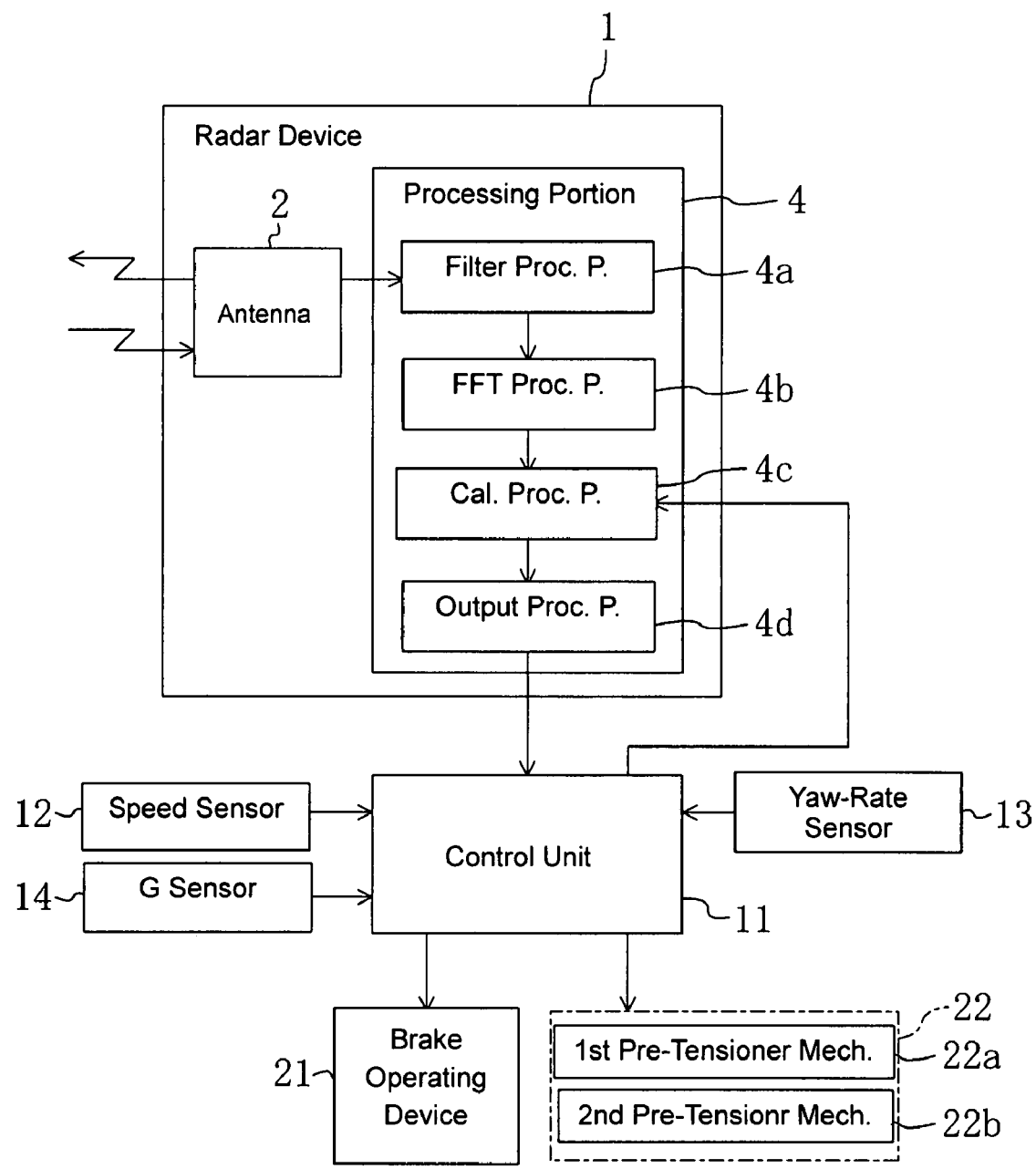
FIG. 2 is a block diagram showing the obstacle detecting control device of a vehicle.

The vehicle further comprises, as shown in FIG. 2, a vehicle speed sensor 12 as a vehicle speed detecting device to detect a traveling speed of the vehicle W, a yaw-rate sensor 13 to detect a yaw rate generating at the vehicle W, and a G sensor 14 to detect a hitting of the vehicle W against an obstacle. Detection information of these sensors 12 to 14 is supplied to the control unit 11.

The brake operating device 21 operates a braking to the vehicle W by applying a braking force to respective vehicle wheels 31. The seatbelt pre-tensioner restrains a passenger seated in a seat 41 of the vehicle W by winding up a seatbelt 51 of the passenger to apply a specified tension to the seatbelt 51.

Hereinafter, a seatbelt device of the vehicle W will be described. The seatbelt device is a three-point type of seatbelt, as shown in FIG. 1, that comprises a retractor portion 53 to wind up the seatbelt 51, a lap anchor portion 54 to which a tip of the seatbelt 51 withdrawn from the retractor 53 is connected, a buckle portion 55 to which a tongue 52 provided at a central portion of the seatbelt 51 is detachably connected. The buckle portion 55 is fixed to a vehicle body beside the seat 41, and the retractor 53 and the lap anchor portion 54 are fixed to the vehicle body on its opposite side of the seat 41. The seatbelt 51 withdrawn from the retractor portion 53 is changed from upward to downward in its withdrawal direction by a slip guide 57 provided at an upper portion of the seat 41, and its tip end is attached to the lap anchor portion 54. The above-described tongue 52 is provided to move on the seatbelt 51 between the slip guide 57 and the lap anchor portion 54. The seatbelt 51 is applied by engaging the tongue 52 with the buckle portion 55.

The seatbelt pre-tensioner 22 is provided in the retractor portion 53 of the above-described seatbelt device. The seatbelt pre-tensioner 22 of the present embodiment comprises, as shown in FIG. 2, a first pre-tensioner mechanism 22a, in which the seatbelt 51 is wound up by an electric motor or the like, and a second pre-tensioner mechanism 22b, in which the seatbelt 51 is wound up with a force of gas generated by an inflator. When the hitting of the vehicle W against the obstacle is predicted (for example, a predicted time of hitting is shorter than a predetermined standard time) according to the obstacle detecting information (except information of a stationary object that is provisionally recognized as the obstacle, which will be described later) supplied from the processing portion 4 of the radar device 1, the above-described control unit 11 operates the first pre-tensioner mechanism 22a to apply a specified tension to the seatbelt 51. Meanwhile, when the hitting of the vehicle W against the obstacle is detected by the G sensor 14, the control unit 11 operates the second pre-tensioner mechanism 22b to apply to the seatbelt 51 a greater tension than the specified tension by the first pre-tensioner mechanism 22a.

The control unit 11 also determines a turning radius of the traveling vehicle W based on detections of the vehicle speed sensor 12 and the yaw-rate sensor 13. Herein, there may be further provided a lateral acceleration sensor to detect an lateral acceleration of the traveling vehicle W or a steering angle sensor to detect a steering angle of a steering wheel of the vehicle W, and a detection of either one of these sensors may be used in place of the detection of the yaw-rate sensor 13 to determine the turning radius of the traveling vehicle W.

The processing portion 4 of the radar device 1 comprises, as shown in FIG. 2, a filter processing portion 4a to conduct a filter processing for the data received by the antenna 2, a FTT processing portion 4b to conduct a FFT processing for the data processed by the filter processing portion 4a, a calculation processing portion 4c to conduct various calculation processing with the data processed by the FFT processing portion 4b, and an output processing portion 4d to conduct an output processing for outputting data obtained by the calculation of the calculation processing portion 4c to the control unit 11.

The calculation processing portion 4c receives the data processed by the FFT processing portion 4b and the vehicle speed and the turning radius of the vehicle W from the control unit 11. Then, the calculation processing portion 4c based on these data makes a determination as to whether or not a received intensity of a reflected wave received by the antenna 2 is a specified threshold or more, decision of properties of the detected object (for example, a distance between the vehicle W and the object, a directional location with respect to the vehicle W (an angle with respect to the radar scan detection center line), and a relative speed with the respect to the vehicle W), a determination as to whether the detected object is a moving object or a stationary object, and a prediction as to a relative moving position of the object with respect to the vehicle W by predicting a traveling path of the vehicle W.

Namely, the calculation processing portion 4c recognizes that the detected object is a potential obstacle that is to be hit by the vehicle when the received intensity of the reflected wave is the specified threshold or more. Meanwhile, when the received intensity of the reflected wave is less than the specified threshold, the calculation processing portion 4c does not recognize so and does not conduct further pursuit any more, which will be described below.

The calculation processing portion 4c also make a determination as to whether the detected object is the stationary object or not based on the above-described relative speed and vehicle speed. Thus, the calculation processing portion 4c constitutes a determining device to determine whether the detected object is a moving object or a stationary object.

Further, the calculation processing portion 4c predicts a traveling path of the vehicle W based on the above-described turning radius. In the present embodiment, a radius of curvature of a traveling path of the vehicle W with a specified width (substantially the same as the width of the vehicle W, or slightly greater than the vehicle width) is set to be the above-described turning radius to be inputted.

The calculation processing portion 4c further predicts a position of the detected object after a specified time has passed (equivalent to a scanning time with the millimeter wave) based on the above-described object properties and the predicted traveling path, and sets a certain determination area that covers a specified area with its center corresponding to the above-described predicted position. Herein, if it is determined that the object that is actually detected after the above-described specified time passage is located within the above-described set determination area, the calculation processing portion 4c determines that the actually now detected object is identical to the object whose position was predicted as described above. Meanwhile, if it is determined that the object that is actually detected after the above-described specified time passage is located outside the determination area, the calculation processing portion 4c determines that the actually-now-detected object is a new object that is different from the object whose position was predicted. In this way, the object that has been detected once is pursued continuously.

The above-described threshold for determining whether the detected object is a potential obstacle to be hit by the vehicle W or not has a plurality of preset values. In the present embodiment, the plural threshold values includes a threshold for moving object to recognize the moving object as the obstacle, and a threshold for stationary object to recognize the stationary object as the obstacle. According to the present embodiment, for example, the threshold for moving object has a value of −50 dBV, and the threshold for stationary object has a value of −30 dBV (as described below, this may be changed to −26 dBV in a certain case).

Herein, the above-described determination as to whether the stationary object is the potential obstacle or not by using the threshold for stationary object in the present embodiment is limited to a particular case where the following conditions are met. These conditions are such that the vehicle speed detected by the control unit 11 is a specified speed (50 km/h, for example) or less, and the distance between the vehicle W and the detected object (stationary object) is a specified distance (40 m, for example) or less. In a case where these conditions are not met, the above-described determination as to whether the stationary object is the potential obstacle or not is made by using the threshold for moving object, not by using the threshold for stationary object, despite the stationary object.

The calculation processing portion 4c, when the above-described conditions are met, recognizes that the stationary object is the above-described obstacle when the received intensity of the reflected wave from the stationary object is the threshold for stationary object or more, while it provisionally recognizes that the stationary object is the obstacle when the received intensity of the reflected wave is the threshold for moving object or more and less than the threshold for stationary object. Also, the calculation processing portion 4c recognizes that the moving object is the above-described obstacle when the received intensity of the reflected wave from the moving object (including the stationary object in a case where the above-described conditions are not met) is the threshold for moving object or more.

The threshold for stationary object includes a first threshold (−30 dBV) and a second threshold (−26 dBV). The calculation processing portion 4c uses this first threshold as the threshold for stationary object in making the determination of the potential obstacle with respect to the stationary object that has been previously recognized as the obstacle or the new stationary object. Meanwhile, the calculation processing portion 4c uses the above-described second threshold as the threshold for stationary object in making the determination of the potential obstacle with respect to the stationary object that has been provisionally recognized as the obstacle. Namely, in order to avoid any risks of improperly repeated recognitions between the above-described recognition and the provisional recognition of the statuary object, the threshold for stationary object has a so-called hysteresis.

The above-described output processing portion 4d outputs the above-described obstacle recognition information, namely data including the obstacle properties, to the control unit 11 as the obstacle detecting information. Also, the output processing portion 4d outputs the above-described data of the stationary object that has been provisionally recognized as the obstacle (stationary object) to the control unit 11 as a different information from the above-described obstacle recognition information on the stationary object that has been recognized as the obstacle.

Figure 3:
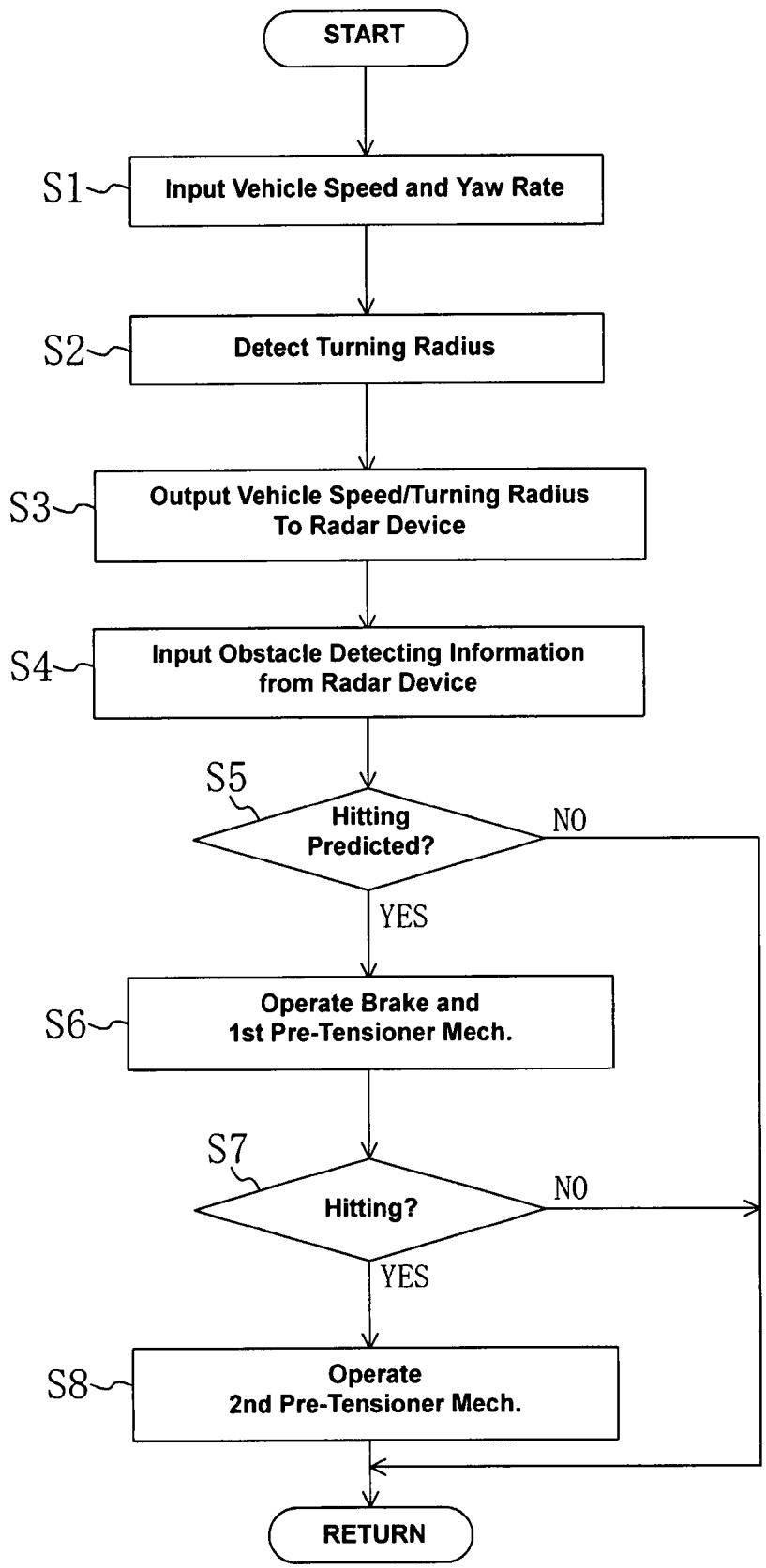
FIG. 3 is a flowchart showing processing operation of a control unit.

Hereinafter, processing operations of the control unit 11 will be described referring to a flowchart of FIG. 3.

First, in step S1, the vehicle speed and the yaw rate that are respectively detected by the vehicle speed sensor 12 and the yaw-rate sensor 13 are inputted. Then, the turning radius of the traveling vehicle W is detected based on the vehicle speed and the yaw rate in step S2. Next, in step S3, the vehicle speed and turning radius are outputted to the calculation processing portion 4c of the processing portion 4 of the radar device 1.

In step S4, the obstacle detecting information from the output processing portion 4d of the processing portion 4 of the radar device 1 is inputted. It is determined based on the inputted obstacle detecting information whether the vehicle W hitting the obstacle is predicted or not in step S5.

When the determination is NO in the step S5, the control sequence returns. When it is YES, the control sequence proceeds to step S6, where the brake operating device 21 is operated to apply the barking to the respective wheels 31 and the first pre-tensioner mechanism 22a of the seatbelt pre-tensioner 22 is operated to apply the specified tension to the seatbelt 51.

Next, in step S7, it is determined based on the information from the G sensor 14 whether the vehicle W hits the obstacle or not. When the determination is NO in the step S7, the control sequence returns. When it is YES, the control sequence proceeds to step S8, where the second pre-tensioner mechanism 22b of the seatbelt pre-tensioner 22 is operated to apply the greater tension to the seatbelt 51, and then the control sequence returns.

Figure 4:
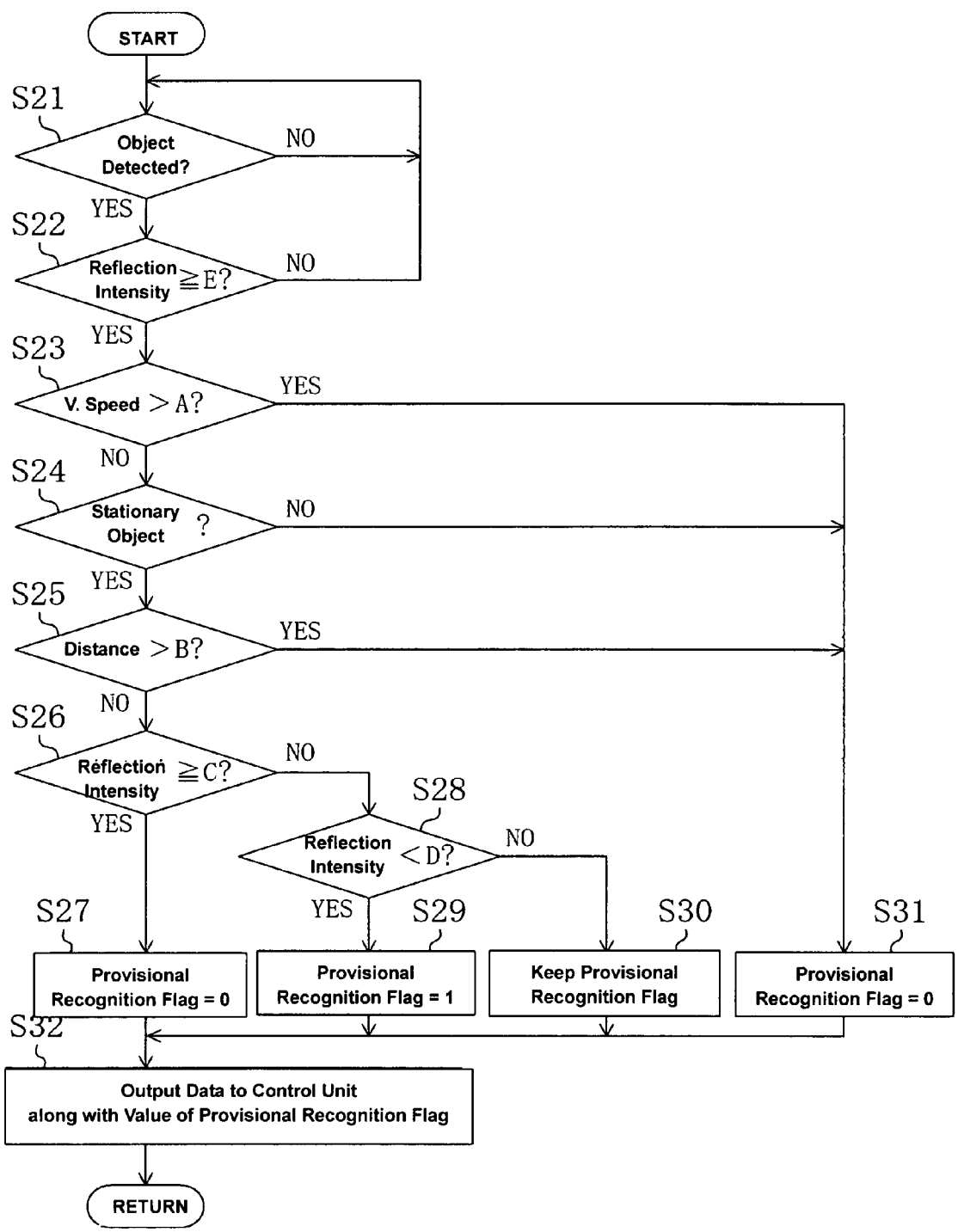
FIG. 4 is a flowchart showing obstacle detecting processing operation of a processing portion of a radar device.

Hereinafter, the obstacle detecting processing operation of the processing portion 4 of the radar device 1 will be described referring to a flowchart of FIG. 4.

First, in step S21, it is determined whether the object is detected or not, namely whether the reflected wave from the object is received by the antenna 2 or not. When the determination in the step S21 is NO, the determination of the step S21 is repeated. When the determination in the step S21 is YES, it is determined in step S22 whether or not the received intensity of the reflected wave from the object (as referred to as "reflection intensity" in the flowchart of FIG. 4) is a threshold for moving object E or more. When the determination in the step S22 is NO, the control sequence returns to the step S21. When the determination in the step S22 is YES, the control sequence proceeds to step S23.

In the step S23, it is determined whether the vehicle speed inputted from the control unit 11 is greater than a specified speed A or not. When the determination is YES in the step S23, the control sequence proceeds to step S31. When it is NO (smaller than the specified speed A), the control sequence proceeds to step S24.

In the step S24, it is determined whether the detected object is the stationary object or not. When the determination is NO in the step S24, the control sequence proceeds to the step S31. When it is YES in the step S24, the control sequence proceeds to step S25.

In the step S25, it is determined whether the distance between the detected object (stationary object) and the vehicle W is greater than a specified distance B or not. When the determination is YES in the step S25, the control sequence proceeds to the step S31. When it is NO (smaller than the specified distance B), the control sequence proceeds to step S26.

In the step S26, it is determined whether or not the above-described reflection intensity is the second threshold C of the threshold for stationary object or more. When the determination is YES in the step S26, the control sequence proceeds to step S27, where a provisional-recognition flag (0 is set, initially) is set to be 0, and then proceeds to step S32.

Meanwhile, when the determination is NO in the step S26, the control sequence proceeds to the step S28, where it is determined whether or not the above-described inflation intensity is less than the first threshold D of the threshold for stationary object. When the determination is YES in the step S28, the control sequence proceeds to step S29, where the provisional-recognition flag is set to 1 and then the control sequence proceeds to step S32. When the determination is NO in the step S28, the control sequence proceeds to step S30, where the provisional-recognition flag is kept to the same as the previous one, and then the control sequence proceeds to the step S32.

In the step S 31, to which the control sequence proceeds when the determination is YES in the step S23, when the determination is NO in the step S24, or when the determination is YES in the step S25, the provisional-recognition flag is set to be 0 and then the control sequence proceeds to the step S32.

In the step S32, the date of the recognized or provisionally-recognized obstacle are outputted to the control unit 11 along with the value of the provisional-recognition flag, and then the control sequence returns.

Setting the provisional-recognition flag to 0 means the recognition that the detected object is the potential obstacle to be hit by the vehicle W. Meanwhile, setting the provisional-recognition flag to 1 means the provisional recognition that the detected object is the above-described obstacle.

When the received intensity of the inflected wave from the object is less than the threshold for moving object E, it is recognized that the detected object is the potential obstacle to be hit by the vehicle W whether the object is the stationary one or not.

When the received intensity of the inflected wave from the object is the threshold for moving object E or more, it is recognized that the detected object, if that is the moving one, is the above-described obstacle. When the speed of the vehicle W is greater than the specified speed A, or the distance between the object and the vehicle W is greater than the specified B, it is recognized that the detected object is the above-described obstacle as well.

Also, in the case where the received intensity of the inflected wave from the object is less than the threshold for moving object E, when the object is the stationary one and the speed of the vehicle W is the specified speed A or less and the distance between the object and the vehicle W is the specified B or less, a determination as to whether or not that stationary object is recognized as the above-described obstacle is made by using the threshold for stationary object. When the received intensity of the inflected wave from the stationary object is the threshold for stationary object or more, it is determined that the stationary object is the above-described obstacle. Meanwhile, when the received intensity is the threshold for moving object E or more and less than the above-described threshold form stationary object, it is provisionally recognized that the stationary object is the above-described obstacle. Herein, the first threshold D is used as the threshold for stationary object when conducting the above-described determination of the stationary object as the obstacle with respect to the stationary object that has been recognized as the obstacle or the new stationary object (namely, the object whose provisional-recognition flag is set to 0). Meanwhile, the second threshold C is used when conducting the above-described determination of the stationary object as the obstacle with respect to the stationary object that has been provisionally recognized as the obstacle (namely, the object whose provisional-recognition flag is set to 1).

The position of the above-described recognized or provisionally-recognized obstacle after the specified time has passed is predicted, and the certain determination area that covers the specified area with its center corresponding to the above-described predicted position is set. And, if it is determined that the recognized or provisionally-recognized obstacle that is detected after the specified time passage is located within the above-described set determination area, it is determined that the actually-now-detected object is identical to the object whose position was predicted as described above. Meanwhile, if it is determined that the obstacle is located outside the determination area, it is determined that the actually-now-detected object is the new object.

The data of the above-described recognized or provisionally-recognized obstacle are outputted to the control unit 11 along with the value of the provisional-recognition flag. Namely, the provisionally-recognized obstacle-related information is outputted to the control unit 11 as a different information from the recognized obstacle-related information.

The control unit 11 receives the above-described obstacle data and the provisional-recognition flag value, determines whether the vehicle W hitting the obstacle is predicted or not based on the data of the obstacle with the provisional-recognition flag of 0 (namely, the obstacle whose hitting possibility with the vehicle W is recognized), and, when the hitting is predicted, operates the brake operating device 21 to reduce the vehicle speed and the first pre-tensioner mechanism 22a of the seatbelt pre-tensioner 22 to apply the specified tension to the seatbelt 51 of the passenger. When the hitting is detected by the G sensor 14, the second pre-tensioner mechanism 22b is operated to apply the greater tension to the seatbelt 51, so that the passenger cab be properly restrained by the seatbelt 51.

Herein, although the data of the obstacle with the provisional-recognition flag of 1 (namely, the obstacle whose hitting possibility with the vehicle W is provisionally recognized) is not used for the hitting prediction in the present embodiment, the determination as to whether the hitting is predicted or not may be made based on this data and when the hitting is predicted, preparations for prompt operations of the brake operating device 21 or the first pre-tensioner mechanism 22a or the like may be conduced.

Figure 5A:
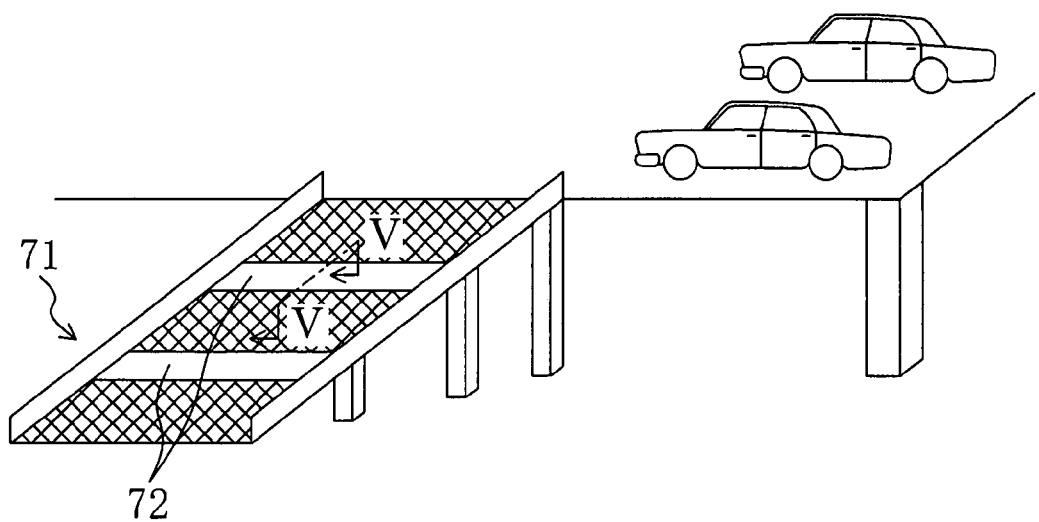
FIG. 5A is a perspective view showing an entrance portion of a two-story parking lot.
Figure 5B:
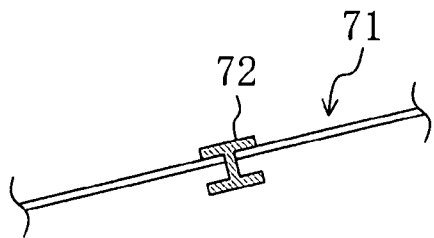
FIG. 5B is a sectional view taken along line V-V of FIG. 5A.

Now, the situation in which the vehicle W travels toward the slope 71 at the entrance of the two-story parking lot as shown in FIG. 5A is considered. The slope 71 is comprised of gratings (meshes), and the connecting portion 72 of the gratings is comprised of the H-shaped steel member shown in FIG. 5B. In general, the received intensity of the reflected wave from the stationary object is the threshold for moving object E or more and less than the first threshold D of the threshold for stationary object. Accordingly, if the threshold for determining whether or not that stationary object is recognized as the obstacle was set to be equal to the threshold for moving object E, that statutory object was recognized as the obstacle, so that the brake operating device 21 and the first pre-tensioner mechanism 22a of the seatbelt pre-tensioner 22 would operate mistakenly when the vehicle W reaches the slope 71.

According to the present embodiment, however, when the speed of the vehicle W is the specified speed A or less and the distance between the object and the vehicle W is the specified B or less, the determination as to whether or not that stationary object is recognized as the obstacle is made by using the threshold for stationary object (the first threshold D or the second threshold C) that is greater than the threshold for moving object E. Accordingly, that stationary object is not recognized as the obstacle, and the vehicle W is allowed to travel passing the slope 71 smoothly, without operating the brake operating device 21 and the like. In the meantime, since that stationary object is also provisionally recognized as the obstacle and pursued, the recognition as the obstacle can be attained promptly in a case where that is the real obstacle.

Herein, the above-described threshold for determining whether or not the object detected by the radar device 1 is the potential obstacle to be hit by the vehicle W is configured to the threshold for moving object and the threshold for stationary object. However, the thresholds may be set to plural ones depending on the kinds of objects.

Also, although the specified conditions for the above-described determination are set to be such that the speed of the vehicle W is the specified speed A or less and the distance between the object and the vehicle W is the specified B or less, they may be set to be such that the speed of the vehicle W is the specified speed A or less or the distance between the object and the vehicle W is the specified B or less.

Further, the above-described specified conditions may be set to be such that a steering angle of a steering wheel of the vehicle W that may be detected by a steering angle sensor newly provided is less than a specified steering angle. Because it can be considered that when the detected steering angle is the specified angle or more, an operation to avoid the obstacle is now conducted.

Or, the above-described specified conditions may be set to be such that an accelerator angle of an accelerator of the vehicle W that may be detected by an accelerator angle sensor newly provided is less than a specified angle. Because it can be considered that when the detected accelerator angle is the specified angle or more, an operation to avoid the obstacle is now conducted.

Or, the above-described specified conditions may be set to be such that a brake-pedal pressing amount of a brake pedal of the vehicle W that may be detected by a brake-pedal pressing-amount detecting sensor newly provided is less than a specified amount. Because it can be considered that when the detected pressing amount is the specified angle or more, an operation to avoid the obstacle is now conducted.

Likewise, the above-described specified conditions may be set to be such that the yaw rate detected by the yaw-rate sensor 13 is less than a specified value. Because it can be considered that when the detected yaw rate is the specified value, an operation to avoid the obstacle is now conducted.

And, the above-described specified conditions may be set to be such that a lateral acceleration of the vehicle W that may be detected by a lateral-accelerator detecting sensor newly provided is less than a specified lateral acceleration. Because it can be considered that when the detected lateral acceleration is the specified lateral accelerator or more, an operation to avoid the obstacle is now conducted.

The present embodiment applies the millimeter-wave radar device as the radar device 1, but any other kinds of radar device can be applied.

Also, any other operational devices, such as a warning device, than the brake operating device 21 and the seatbelt pre-tensioner 22 may be applied as well.

Thus, the present invention should not be limited to the above-described embodiments, and any other modifications and improvements my be applied within the scope of a spirit of the present invention.

What is claimed is:

1. An obstacle detecting control device of a vehicle, which includes a radar device to detect an obstacle in front of the vehicle and an operational-device control device to control an operational device of the vehicle according to an obstacle detecting information detected by the radar device, wherein:

said radar device is configured to transmit an electric wave and receives a reflected wave that is generated by a reflection of the electric wave on an object, to recognize the object is a potential obstacle that is to be hit by the vehicle when a received intensity of the reflected wave thereby is a specified threshold or more, and to output an information related to the recognized object as the potential obstacle to said operational-device control device as the obstacle detecting information;

said radar device comprises a determining device to determine whether the detected object is a moving object or a stationary object, and said plural threshold values includes a threshold for moving object and a threshold for stationary object, the threshold for moving object being for recognizing the moving object as the obstacle, the threshold for stationary object being for recognizing the stationary object as the obstacle;

said threshold for stationary object is configured to have a greater preset value than said threshold for moving object, said threshold for stationary object comprising a first threshold and a second threshold that is greater than the first threshold;

said radar device is configured to recognize that the stationary object determined by said determining device is said obstacle when said received intensity of the reflected wave from the stationary object is said first threshold for stationary object or more, said radar device is further configured to provisionally recognize that the stationary object determined by said determining device is said obstacle as a potential object when said received intensity of the reflected wave from the stationary object is said threshold for moving object or more and less than said first threshold for stationary object, and obstacle-related information of the stationary object that has been provisionally recognized as the potential obstacle is outputted to said operational-device control device as a different information from obstacle-related information of the stationary object that has been recognized as the obstacle; and said radar device is configured to recognize that said stationary object which is previously determined by said determining device as the potential object is said obstacle when said received intensity of the reflected wave from the stationary object is said second threshold for stationary object or more.

2. The obstacle detecting control device of a vehicle of claim 1, wherein there is further provided a vehicle speed detecting device to detect a traveling speed of the vehicle, and said radar device is configured to conduct a determination of the stationary object as said obstacle by using said threshold for stationary object when the vehicle traveling speed detected by the vehicle speed detecting device is a specified speed or less.

3. The obstacle detecting control device of a vehicle of claim 1, wherein there is further provided a vehicle speed detecting device to detect a traveling speed of the vehicle, said radar device further detects a distance between the detected object and the vehicle, and the radar device is configured to conduct a determination of the stationary object as said obstacle by using said threshold for stationary object when said distance detected by the radar device is a specified distance or less and the vehicle traveling speed detected by the vehicle speed detecting device is a specified speed or less.

4. The obstacle detecting control device of a vehicle of claim 1, wherein said radar device is a millimeter-wave radar.

5. The obstacle detecting control device of a vehicle of claim 1, wherein said operational device is a brake operating device to operate a braking of the vehicle.

6. The obstacle detecting control device of a vehicle of claim 1, wherein said operational device is a seatbelt pre-tensioner to restrain a passenger by winding up a seatbelt of the passenger to apply a specified tension to the seatbelt.

* * * * *